(12) United States Patent
Ohguro

(10) Patent No.: US 7,508,984 B2
(45) Date of Patent: Mar. 24, 2009

(54) LANGUAGE RECOGNITION METHOD, SYSTEM AND SOFTWARE

(75) Inventor: Yoshihisa Ohguro, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 830 days.

(21) Appl. No.: 10/903,131

(22) Filed: Jul. 30, 2004

(65) Prior Publication Data

US 2005/0027511 A1 Feb. 3, 2005

(30) Foreign Application Priority Data

Jul. 31, 2003 (JP) ............................. 2003-204353

(51) Int. Cl.
*G06K 9/00* (2006.01)
*G06F 17/27* (2006.01)

(52) U.S. Cl. .......................... 382/181; 704/9

(58) Field of Classification Search ................. 382/159, 382/173, 176, 181, 190, 209, 218, 224; 704/2, 704/3, 9, 231
See application file for complete search history.

(56) References Cited

U.S. PATENT DOCUMENTS

| | | | |
|---|---|---|---|
| 4,926,490 A * | 5/1990 | Mano | 382/177 |
| 5,646,840 A | 7/1997 | Yamauchi et al. | |
| 5,652,896 A | 7/1997 | Yamauchi et al. | |
| 5,675,815 A | 10/1997 | Yamauchi et al. | |
| 5,845,143 A | 12/1998 | Yamauchi et al. | |
| 5,920,658 A * | 7/1999 | Yamagata et al. | 382/293 |
| 5,943,443 A * | 8/1999 | Itonori et al. | 382/225 |
| 6,246,976 B1 * | 6/2001 | Mukaigawa et al. | 704/9 |
| 6,272,242 B1 * | 8/2001 | Saitoh et al. | 382/187 |
| 6,721,451 B1 * | 4/2004 | Ishitani | 382/181 |
| 6,751,605 B2 * | 6/2004 | Gunji et al. | 707/1 |
| 7,142,716 B2 * | 11/2006 | Katsuyama et al. | 382/190 |

FOREIGN PATENT DOCUMENTS

JP 11-191135 7/1999

* cited by examiner

*Primary Examiner*—Daniel G Mariam
(74) *Attorney, Agent, or Firm*—Knoble Yoshida & Dunleavy, LLC

(57) ABSTRACT

A language such as English or a language group such as an Asian language group is recognized based upon document image data. The document image data is processed to determine a minimal circumscribing rectangle for each character. The layout characteristics of the minimal circumscribing rectangles are quantified in a discrete number of ranges. The layout characteristic information includes a certain ratio with respect to the minimal circumscribing rectangle height and width as well as a black pixel density in the minimal circumscribing rectangle. Based upon the quantified layout characteristic information, an occurrence probability of a predetermined number of characters is determined using training data for a predetermined number of languages. The occurrence probability is stored in a table for later reference for an unknown input language.

12 Claims, 11 Drawing Sheets

FIG. 2(A)

XL/IXLA◎㈱アドイン研究所:ZERO、
AI-DNA◎㈱アイザック：K-Prolog、
K-Prologコンパイラ、methodlog◎岩
崎技研工業㈱：AZ-Prolog、C-Prolog
◎㈲インターメディア・アクセス：Astral
・・・・・・・・・・・・・・・・
・・・・・・・・・・・・・・・・
・・・・・・・・・・・・・・・・

XL/IXLA◎㈱アドイン研究所:ZERO、
AI-DNA◎㈱アイザック：K-Prolog、
K-Prologコンパイラ、methodlog◎岩
崎技研工業㈱：AZ-Prolog、C-Prolog
◎㈲インターメディア・アクセス：Astral
・・・・・・・・・・・・・・・・
・・・・・・・・・・・・・・・・
・・・・・・・・・・・・・・・・

FIG. 2(C)

XL/IXLA◎㈱アドイン研究所:ZERO、 ～20
AI-DNA◎㈱アイザック：K-Prolog、 ～20
K-Prologコンパイラ、methodlog◎岩 ～20
崎技研工業㈱：AZ-Prolog、C-Prolog ～20
◎㈲インターメディア・アクセス：Astral ～20
・・・・・・・・・・・・・・・・
・・・・・・・・・・・・・・・・
・・・・・・・・・・・・・・・・

MINIMAL CIRCUMSCRIBING RECTANGULAR COORDINATES

MINIMAL CIRCUMSCRIBING RECTANGLES IN ENGLISH CHARACTER LINE

MINIMAL CIRCUMSCRIBING RECTANGLES IN JAPANESE CHARACTER LINE

METHOD OF QUANTIZING LAYOUT INFO ON MINIMAL CIRCUMSCRIBING RECTANGLES IN CHARACTER LINE

H : LINE HEIGHT
h : MINIMAL CIRCUMSCRIBING RECTANGULAR HEIGHT
W : MINIMAL CIRCUMSCRIBING RECTANGULAR WIDTH
Ys : MINIMAL CIRCUMSCRIBING RECTANGULAR STARTING POINT

·s021,s124,s032,s048,s012,...

·s243,s086,s045,s189,s211,...

| TRIGRAM | p(wi|wi-2,wi-1) | ln(wi|wi-2,wi-1))*(-1000) |
|---|---|---|
| [s013,s045,s032] | 1.00000 (1/1) | 0 |
| [s013,s064,s033] | 0.75000 (3/4) | 287 |
| [s015,s005,s221] | 0.23077 (6/26) | 1466 |
| [s016,s145,s203] | 1.00000 (2/2) | 0 |
| [s134,s002,s102] | 0.20896 (14/67) | 1565 |
| [s134,s095,s244] | 1.00000 (1/1) | 0 |
| [s137,s187,s105] | 0.50000 (1/2) | 693 |
| [s138,s076,s228] | 0.01923 (1/52) | 3951 |
| [s140,s097,s003] | 0.04348 (1/23) | 3135 |
| [s141,s045,s013] | 0.04478 (3/67) | 3106 |
| . . . . . . . | | |

FIG. 12

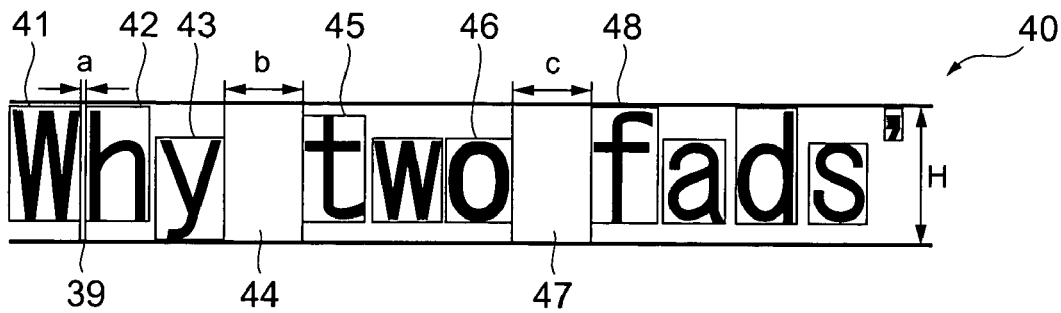

·s021,s124,s032,sSPC,s048,s012,...

FIG. 13

| STARTING HEIGHT INFO AREA | MINIMAL RECTANGULAR HEIGHT AREA | MINIMAL RECTANGULAR WIDTH AREA |
|---|---|---|
| 4bits | 3bits | 1bits |

8bits=1byte

FIG. 7

$$P(W) = \prod_{i=1}^{n} P(w_i | w_{i-2}, w_{i-1}) \quad \cdots \quad (1.1)$$

$P(w_i | w_{i-2}, w_{i-1})$: CONDITIONAL PROBABILITY FOR $w_i$ OCCURRING AFTER $w_{i-2}, w_{i-1}$ $$P(w_i | w_{i-2}, w_{i-1}) = C(w_{i-2}, w_{i-1}, w_i) / C(w_{i-2}, w_{i-1}) \quad \cdots \quad (1.2)$$

$C(w_{i-2}, w_{i-1})$ : OCCURRENCE PROBABILITY $w_{i-2}, w_{i-1}$
$C(w_{i-2}, w_{i-1}, w_i)$ : OCCURRENCE PROBABILITY $w_{i-2}, w_{i-1}, w_i$
$w_i$ REPRESENTS A SINGLE CHARACTER IN A WORD OF A NATURAL LANGUAGE TO BE RECOGNIZED

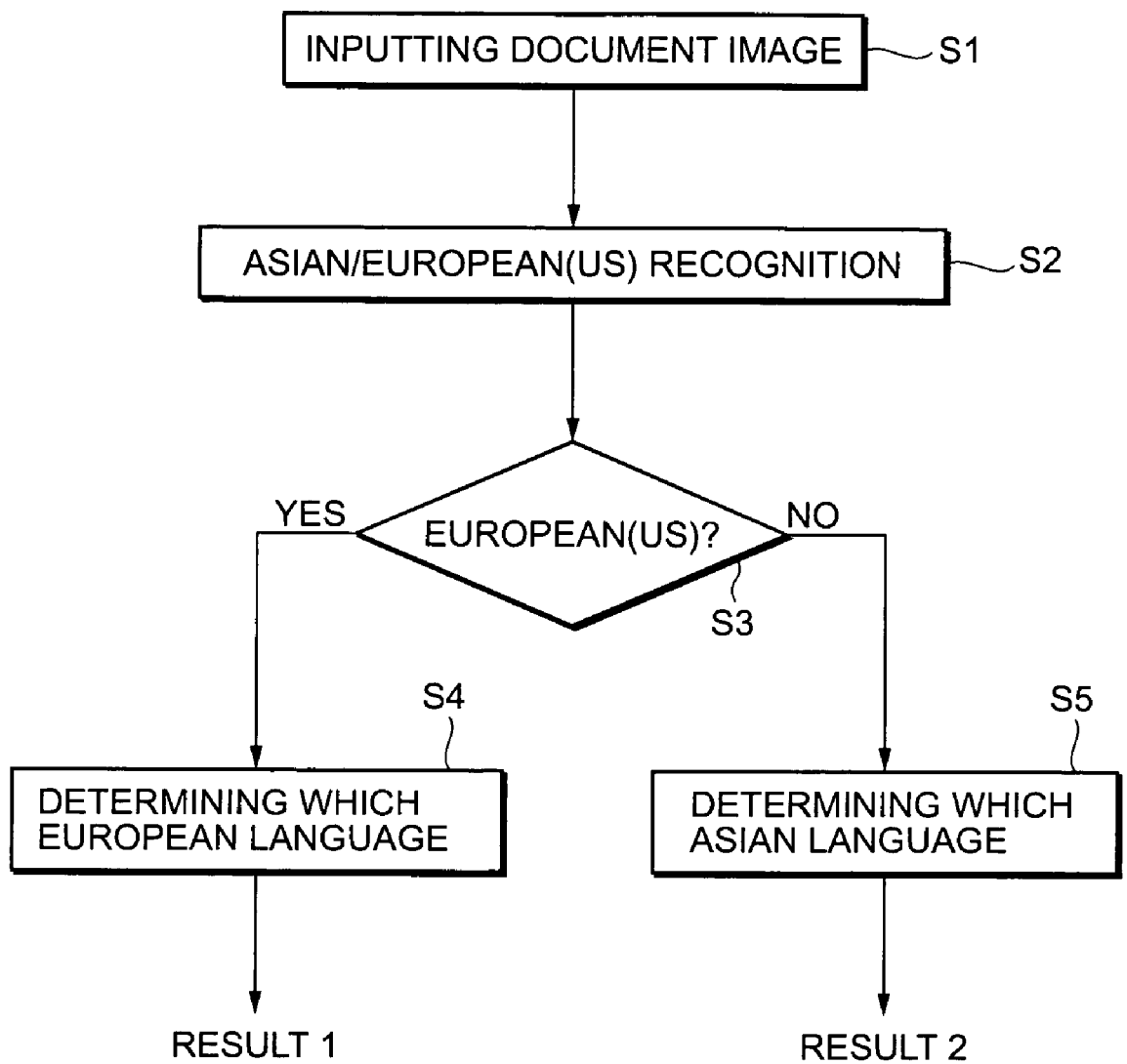

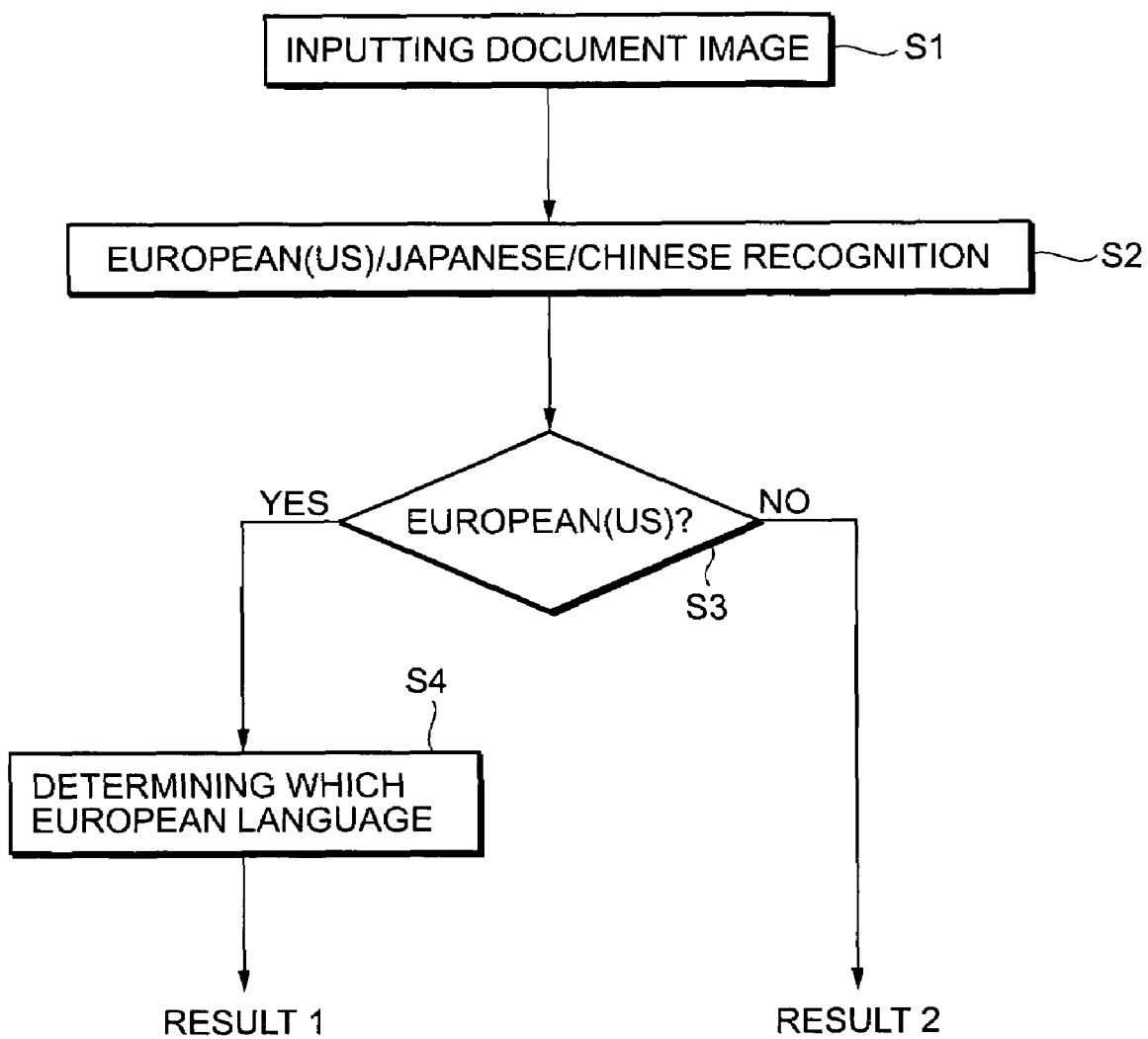

LANGUAGE RECOGNITION METHOD, SYSTEM AND SOFTWARE

FIELD OF THE INVENTION

The current invention is generally related to language recognition, and more particularly related to a method, an apparatus and a software program for recognizing a certain language or a certain language group based upon physical layout characteristics of character images.

BACKGROUND OF THE INVENTION

Character recognition is language-dependent. To perform certain character recognition on a document image, if a character recognition device is not suitable for a particular language of the document image, a high recognition rate is not obtained. To solve the language dependency aspects, a large number of prior art techniques has paid attention to certain aspects of language recognition. One exemplary prior art technique reduces the size of a document image for language recognition. The black running pixels are extracted from the reduced document image so as to generate minimal circumscribing rectangles. In the English language, the minimal circumscribing rectangles are fused with each other for every word to form a connected rectangle part. Since a number of characters is predetermined and constant for forming words in English, it is characterized that the height-to-width ratio of the minimal circumscribing rectangles often ranges from 2 to 6 or 7. On the other hand, the minimal circumscribing rectangles vary significantly in the Japanese language. In some instances, the minimal circumscribing rectangles are exceptionally long in Japanese that they usually do not appear in English. In other instances, the minimal circumscribing rectangles correspond to a single character in Japanese.

Based upon the above described length of the minimal circumscribing rectangles, one prior art technique determines the language of a document. The connected minimal circumscribing rectangles are grouped into three categories including short, middle and long for each character line or character area. That is, if a line is oriented in a horizontal direction of a page, the ratio is determined based upon the width and the height of the minimal circumscribing rectangles. For example, if the width/height ratio is equal to or smaller than two, the corresponding minimal circumscribing rectangle is categorized as a short one. Similarly, if the width/height ratio is ranges from two to six, the corresponding minimal circumscribing rectangle is categorized as a middle one. Lastly, if the width/height ratio is equal to or above six, the corresponding minimal circumscribing rectangle is categorized as a long one. The frequency in occurrence of each category is compared to a predetermined threshold value in order to determine the language such as English or Japanese.

Other characteristics are also considered in prior art techniques to determine a language. For example, Japanese Patent Publication Hei 11-191135 discloses a technique to measure a distance between adjacent minimal circumscribing rectangles. The relevant portions of the disclosures include Paragraphs 40, 45, 50, 56, FIG. 3 and FIG. 20. In Japanese, the shortest distance between two adjacent minimal circumscribing rectangles on the same line often occurs between two certain components of Chinese characters. These two components are called "hen" and "tsukuri." However, in English, the shortest distance tends to occur between two adjacent minimal circumscribing rectangles of characters in the same word when the words are proportionally laid out.

The above described language recognition techniques are based upon certain unique characteristics of the English and Japanese languages. In the above prior art techniques, the unique characteristics must be learned and analyzed in order to make a determination. Furthermore, when other languages such as French or German are used in lieu of English, the above prior art techniques are not necessarily accurate in distinguishing either of other languages from the Japanese language. It becomes almost impossible for the prior art techniques to determine whether a particular language is either an Asian language or European/US language if the possibilities include multiple languages. For example, if the possibilities include Japanese, Chinese, Korean, English, French, German, Italian and Spanish, the Asian language group includes Japanese, Chinese and Korean while the European/US language group includes English, French, German, Italian and Spanish. In addition, the speed of the language recognition is critical for practical applications, and the prior art techniques are not keen on the high-speed processing speed.

The language recognition is useful for various reasons. One exemplary application of the language recognition is a pre-processing for an optical character recognition (OCR) system. In general, characters are recognized by applying a set of language-specific criteria including a dictionary. In other words, without the correct recognition of the language, the character recognition is not accurately accomplished. For this reason, it is highly desired to determine a language of text or document images. Another exemplary application is an automated deliver system to deliver an incoming correspondence to an appropriate destination within the same organization. For example, when a letter in English arrives from a customer, the letter is delivered to a customer service representative who reads English. Similarly, when a letter in Spanish arrives from a customer, the letter is delivered to a customer service representative who reads Spanish. The automated delivery system thus increases the efficiency in the organization.

In the language recognition system, certain aspects remain to be desired for improvement. As described above, it remains desired to recognize a particular language among a plurality of languages that include both Asian languages and European/US languages. It also remains desired that the language recognition process is accomplished at a high speed so that there is no substantial delay for the subsequent processes.

SUMMARY OF THE INVENTION

In order to solve the above and other problems, according to a first aspect of the current invention, a method of quantifying document image data, a processor to implement the following steps: quantifying a predetermined number of consecutive characters in first document image data into first quantified data based upon layout characteristics information, the first document image data containing character lines, each of the character lines including characters, the layout characteristic information being based upon a minimal circumscribing rectangle around each of the characters, the layout characteristic information including a plurality of parameters, the parameters including a combination of information on a height of the minimal circumscribing rectangle starting from a bottom line in the character line, a height of the minimal circumscribing rectangle, a width of the minimal circumscribing rectangle, a black pixel density in the minimal circumscribing rectangle and a distance between two adjacent ones of the minimal circumscribing rectangles; converting the first quantified data into symbol series; and generating a table representing occurrence probabilities of the consecutive characters based upon the symbol series.

According to a second aspect of the current invention, a computer readable medium containing computer-readable instructions for quantifying document image data, the compute-readable instructions performing the tasks of: quantifying a predetermined number of consecutive characters in first document image data into first quantified data based upon layout characteristic information, the first document image data containing character lines, each of the character lines including characters, the layout characteristic information being based upon a minimal circumscribing rectangle around the each of the characters, the layout characteristic information including a plurality of parameters, the parameters including a combination of information on a height of the minimal circumscribing rectangle starting from a bottom line in the character line, a height of the minimal circumscribing rectangle, a width of the minimal circumscribing rectangle, a black pixel density in the minimal circumscribing rectangle and a distance between two adjacent ones of the minimal circumscribing rectangles; converting the first quantified data into symbol series; and generating a table representing occurrence probabilities of the consecutive characters based upon the symbol series.

According to a third aspect of the current invention, an apparatus for quantifying document image data, including: an input unit for inputting first document image data containing lines and characters in the lines, the first document image data having certain layout characteristics; a data processing unit connected to the input unit for quantifying a predetermined number of consecutive ones of the characters in the first document image data into first quantified data based upon layout characteristics information, the data processing unit converting the first quantified data into symbol series, the data processing generating a table representing occurence probabilities of the consecutive characters based upon the symbol series, the data processing unit generating a minimal circumscribing rectangle around each of the characters, the layout characteristic information being based upon the minimal circumscribing rectangle, a width of the minimal circumscribing rectangle, a black pixel density in the minimal circumscribing rectangle and a distance between two adjacent ones of the minimal circumscribing rectangle and a distance between two adjacent ones of the minimal circumscribing rectangles; and a data storage unit connected to the data processing unit for storing the first quantified data, the symbol series, occurrence probabilities and the table.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is an exemplary language input data portion for showing certain aspects of the preferred process according to the current invention.

FIG. 7 shows equations illustrating how the N-gram model is mathematically defined and applied to the language recognition process according to the current invention.

FIG. 12 is a diagram illustrating how a blank distance is used in a preferred process of generating symbols according to the current invention.

FIG. 13 is a diagram illustrating a data structure for the above described layout information on the in-line minimal circumscribing rectangle according to the current invention.

FIG. 14 is a flow chart illustrating steps involved in a preferred process of recognizing a language according to the current invention.

FIG. 15 is a flow chart illustrating steps involved in another preferred process of recognizing a language according to the current invention.

DETAILED DESCRIPTION OF THE PREFERRED EMBODIMENT(S)

Based upon incorporation by external reference, the current application incorporates all disclosures in the corresponding foreign priority document (JP2003-204353) from which the current application claims priority.

Figure 1:
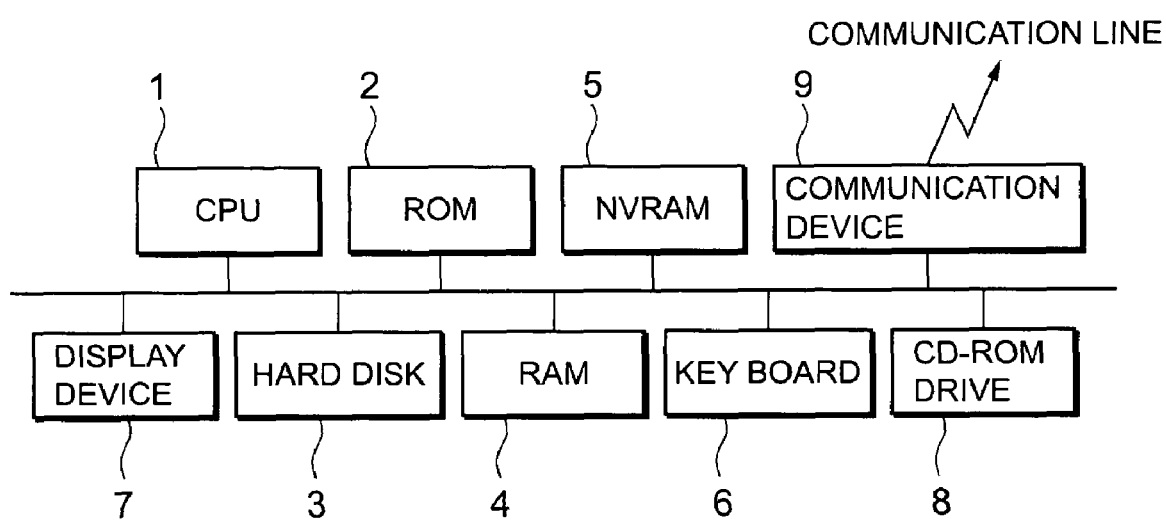
FIG. 1 is a block diagram illustrating one preferred embodiment of the language recognition device according to the current invention.

Referring now to the drawings, wherein like reference numerals designate corresponding structures throughout the views, and referring in particular to FIG. 1, a block diagram illustrates one preferred embodiment of the language recognition device according to the current invention. The language recognition device includes a central processing unit (CPU) 1, a read only memory (ROM) 2, a storage memory 3, a random access memory (RAM) 4, a non-volatile random access memory (NVRAM) 5, an input device 6 such as a keyboard, a display unit 7, a media driver 8 and a communication unit 9. The CPU 1 controls the language recognition process while the ROM 2 stores software programs to be executed by the CPU 1 to implement the language recognition process/device. The storage memory 3 stores in a hard disk media document image data that has been scanned by a scanner, document image data that has been generated by a personal computer or document image data that has been transmitted through a communication line. The RAM 4 temporarily holds the image data that has been read from the hard disk. The NVRAM 5 holds a non-volatile list of trigrams that has been generated based upon the standard language training data. The user or operator uses the keyboard 6 to input various commands. The display unit 8 displays various inputs and input status. The media driver 8 is a driver for inputting a software program from a medium such as a CD-ROM disk so that the software program implements the language recognition device/process according to the current invention. The communication unit 9 transmits or receives document image data via line such as the Internet and LAN.

Now referring to FIG. 2, an exemplary language input data portion is illustrated to show certain aspects of the preferred process according to the current invention. In the following description, the units and components of FIG. 1 are referred. However, the reference is made to exemplify the description and not to limit the implementation of the current invention. After an operator inputs a command for recognizing a language from the keyboard 6, the CPU 1 initiates the image processing on the image data as shown in FIG. 2A. The image data that is received from a scanner is standard Japanese input image data for training the recognition system. The image processing determines an extent of continuous running black pixels. As shown in FIG. 2B, minimal circumscribing rectangles such as indicated by reference numbers 11, 12 and 13 are subsequently determined to limit the extent of each set of the continuously running black pixels. As indicted by the minimal circumscribing rectangles 11, 12 and 13, each character is marked by a corresponding one of the minimal circumscribing rectangles. The CPU 1 and the software program then connect the adjacent minimal circumscribing rectangles to extend to character lines 20 as shown in FIG. 2C. The CPU 1 and the software program perform a language recognition process on the above determined minimal circumscribing rectangles in the character lines 20. Herein after, the minimal circumscribing rectangles in the character lines 20 are referred to as in-line minimal circumscribing rectangles. Since the above described aspects of the image data process are well known to one of ordinary skill, the detailed description will not be provided in the current application.

Figure 3A:
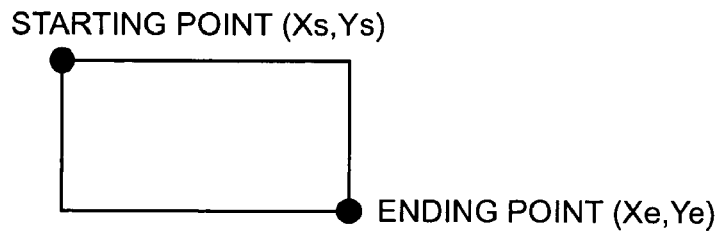
FIGS. 3A through 3C are block diagrams illustrating lay-out information on the in-line minimal circumscribing rectangles according to the current invention.
Figure 3B:
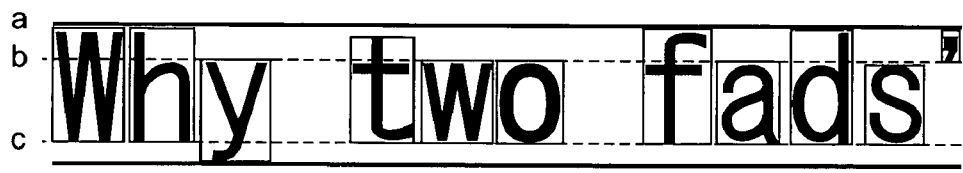
Figure 3C:
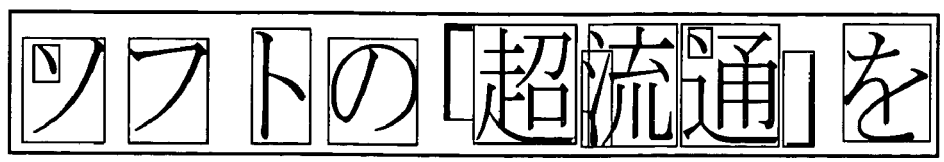

Now referring to FIG. 3, a block diagram illustrates layout information on the in-line minimal circumscribing rectangles according to the current invention. In general, FIG. 3A shows coordinates for certain positions in the in-line minimal circumscribing rectangle. In this example, a starting point is located at an upper left corner (Xs, Ys) of the minimal circumscribing rectangle. An ending point is located at a lower right corner (Xe, Ye) of the minimal circumscribing rectangle. FIG. 3B illustrates in-line minimal circumscribing rectangles for an exemplary sentence of the English language. Lastly, FIG. 3C illustrates in-line minimal circumscribing rectangles for an exemplary sentence of the Japanese language. As shown, the English language has capital letters such as "W" and small letters such as "h" in the exemplary sentence. In European/US languages, when characters such as apostrophe in English, accentegue in French or umrout in German exist, they become a part of either capital or small characters. The height at the beginning point of the in-line minimal circumscribing rectangle tends to concentrate at an upper edge position "a" and a position "b" that is located at a predetermined distance below the upper edge position a. In the European/US languages, a number of the sizes of the minimal circumscribing rectangle is limited to a small number. Lastly, FIG. 3C illustrates in-line minimal circumscribing rectangles for an exemplary sentence of the Japanese language. In the Japanese language, three sets of characters co-exist and include "kanji," "katakana" and "hiragana." In the Korean language, "hanguru" also co-exists. In general, the Asian languages are more complex in the character structure than the European/US languages. In the Asian languages, the height of the starting point in the in-line minimal circumscribing rectangle fail to focus at two locations as illustrated in FIG. 3B. In other words, a number of sizes of the in-line minimal circumscribing rectangles in the Asian language far exceeds that of the European/US languages.

Still referring to FIG. 3, there are other distinguishing features between the Asian languages and the European/US languages. Because the structure of Asian characters is more complex than that of European/US characters, the black pixel density in the in-line minimal circumscribing rectangles is substantially higher in the Asian characters than in the European/US characters. Another distinguishing feature is that in Asian languages such as Japanese and Chinese, no substantial space is inserted between words. In contrast, in European/US languages, certain space is generally inserted between words. In summary, the Asian characters and the European/US characters are distinguished based upon the above described features in a particular line. According to the current invention, the features include a) the height of the starting point in the in-line minimal circumscribing rectangle, b) the height of the minimal circumscribing rectangle, c) the width of the minimal circumscribing rectangle, d) the black pixel density in the in-line minimal circumscribing rectangle and e) the blank existence, and a combination of the features is used to distinguish between the Asian languages and the European/US languages.

Figure 4:
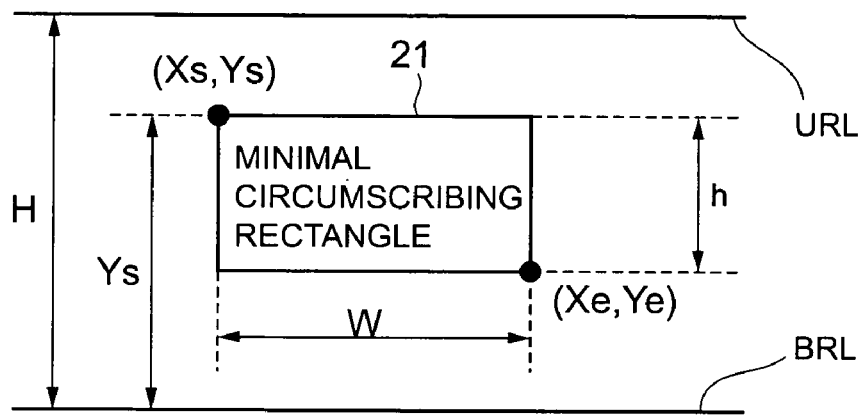
FIG. 4 is a diagram illustrating one preferred embodiment for quantifying the lay-out information in the in-line minimal circumscribing rectangle according to the current invention.

Now referring to FIG. 4, a diagram illustrates one preferred embodiment for quantifying the lay-out information in the in-line minimal circumscribing rectangle according to the current invention. To illustrate an example, the components and units of the preferred embodiment are referred with respect to FIG. 1, but the reference is only exemplary and not limited to particular implementations. The CPU 1 quantifies parameter values for the lay-out information on the in-line minimal circumscribing rectangles in a predetermined discrete manner. The CPU 1 attaches a label to the quantified information on the in-line minimal circumscribing rectangle and converts the in-line minimal circumscribing rectangle to a symbol series. The in-line minimal circumscribing rectangle 21 is specified by the starting point coordinate (Xs, Ys) and the ending point coordinate (Xe, Ye) within the character line height H. Thus, the in-line minimal circumscribing rectangle 21 has a height h and a width W, and the starting point (Xs, Ys) or the upper left corner is located at the height Ys from a bottom rectangle line BRL. The lay-out information of the in-line minimal circumscribing rectangle is expressed by a set of three parameters: the starting point coordinate, the height and the width. That is, temporal information on the in-line minimal circumscribing rectangle is expressed by a row of three-dimensional vectors to indicate the left-to-right order. The various vectors are not limited to a predetermined number by quantifying each dimensional value in discrete steps. Since the line height is variable if no document format is specified, the height Ys is normalized in discreetly quantifying the height Ys at the starting point by determining YsRate=Ys/H where YsRate is a normalized value that does not depend upon the character line height H. Since 0<YsRate<=1, in order to discretely quantify YsRate in N steps, YsYal=INT (YsRate*(N−1)), where INT( ) discards sub-decimal numbers. Thus, the vector values are symbolized by attaching an ID label ranging from 0 to (N−1) to each discrete step or range. Due to the above ID label, the in-line minimal circumscribing rectangular temporal information is now converted into discrete ID's or a symbol series.

Figure 5A:
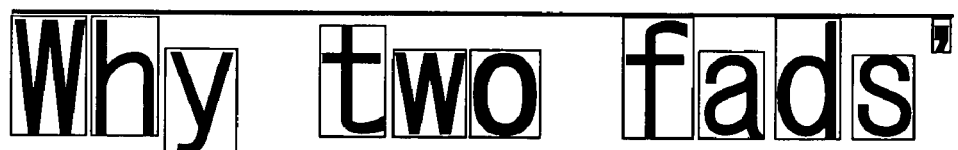
FIG. 5 is a diagram illustrating a preferred process of converting language characters into symbols according to the current invention.
Figure 5B:
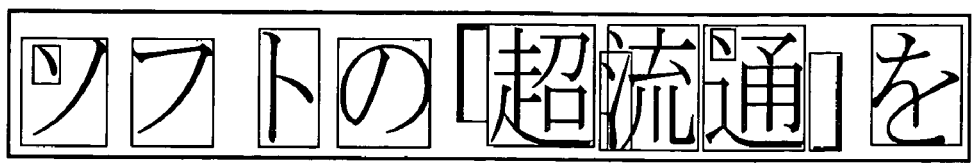

Now referring to FIG. 5, a diagram illustrates a preferred process of converting language characters into symbols according to the current invention. In general, the Asian or European/US characters are converted into symbols based upon the starting point height of an in-line minimal circumscribing rectangle. As shown in FIG. 5A, the alphabetical characters, "W," "h," "y," "t" and "w" respectively receive the following ID labels, S021, S124, S032, S048 and S012. Similarly, as shown in FIG. 5B, the Japanese characters "ツ," "フ," "ト," "の," and "「" respectively receive the following ID labels, S243, S086, S045, S189 and S211. In generating symbol series, if an original document is scanned at an angle and not straight with respect a scanning direction of a scanner, the character line is also tilted. In some extreme cases, lines are not correctly extracted or the line extraction is failed. With a slight tilt, the line extraction is correctly performed based upon the space between the lines. However, since the in-line minimal circumscribing rectangular starting height Ys is used for the symbol conversion, the in-line minimal circumscribing rectangular tilt affects the above symbol series generation. In order to avoid the undesired effect of the tilt, certain care should be taken in generating the image data.

Figures 6, 8:
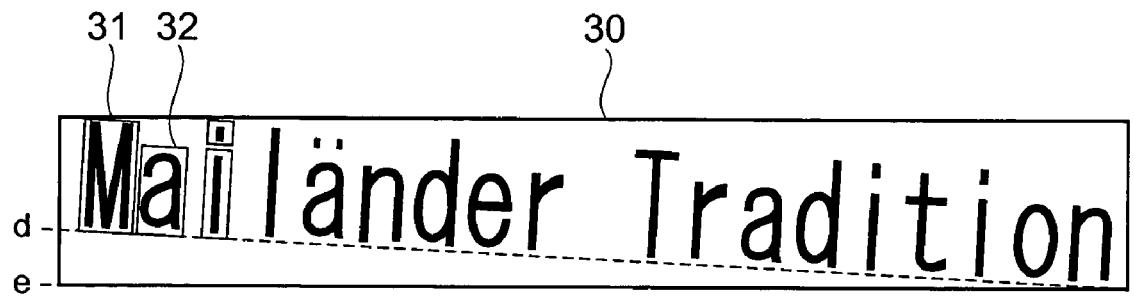
FIG. 6 is a block diagram illustrating a situation in which the character line is tilted and scanned.
FIG. 8 is an exemplary trigram table for certain training data.

Now referring to FIG. 6, a block diagram illustrates a situation in which the character line is tilted and scanned. A dotted line e indicates an original base line for the extracted character line 30. However, because of the tilted scan, the baseline is also tilted. The tilted line d causes the in-line minimal circumscribing rectangular starting height to vary across the board with respect to the character line. As shown in minimal circumscribing rectangles 31 and 32, the height undesirably varies. Consequently, the in-line minimal circumscribing rectangular starting heights fail to concentrate on the above described two predetermined values. To avoid the above failure, the new base line d is determined, and the in-line minimal circumscribing rectangular starting height is measured from the new base line d for the in-line minimal circumscribing rectangles 31, 32 and others in the character line 30. The new base line d is obtained by connecting the ending points of the in-line minimal circumscribing rectangles as well as the ending point of the character line 30. In further detail, the base line d is determined from a regression line based upon the distribution of ending points of the in-line minimal circumscribing rectangles. The regression line is obtained by a prior art known technique. As described above, the in-line minimal circumscribing rectangles are converted into symbol series. The tendency in the symbol rows reflects the layout of the in-line minimal circumscribing rectangles. One way to determine the in-line minimal circumscribing rectangular layout is to generate a trigram model.

Now referring to FIG. 7, equations illustrate how the N-gram model is mathematically defined according to the current invention. The N-gram model to be used as a language model in the language recognition device is the statistical language (here in after N-gram) model that has been proposed by the information theorist, Claude Elwood Shannon. The N-gram model determines the occurrence of the predetermined N items in each language. For each language, the simultaneous occurrence of the frequency W1, W2, W3 . . . Wn or P(W) is divided into conditional products. It is impossible to estimate conditional probabilities P(W1|W1, W2 . . . Wi-2, Wi-1) for all combinations for each language since the language is not a fixed phenomenon and has an input mechanism. For this reason, the probability is approximated by the N−1 Markov process in which the probability for occurrence depends upon the immediately preceding N−1 phenomena. As the value for N increases, although a wider range of characteristics is expressed, since the combinations also increases in the order of a function, it becomes impractical. In reality, N is set to a value of 3, and the model is thus called trigram. By N=3, the occurrence frequency is determined according to Equations 1.1 and 1.2 of FIG. 7. According to P(Wi|Wi-2, Wi-1) in the Equation 1.1, a trigram model is generated based upon the training data of a predetermined standard language. That is, the probability for having a predetermined character is determined after a row of two consecutive particular characters. The trigrams model corresponds to a certain probability to a particular row of three characters. The trigram model is stored in a trigram table for each of the predetermined languages. The stored trigram model calculates a probability for occurrence in each language. For each language, the occurrence probability is added. Based upon the added results, the maximal occurrence probability is determined for each language. Lastly, a current language is determined based upon the maximal occurrence probability. As described above, of course, in the pre-process, symbols are generated from predetermined training data for a particular language based upon the minimal circumscribing rectangles for characters and quantifying parameters. According to the Equation 1.1, the occurrence frequency of three symbols is determined with the corresponding condition and is stored in the NVRAM 5.

Now referring to FIG. 8, an exemplary trigram table is illustrated for certain training data. For example, in one trigram model, [S013, S045, S032], the probability for S032 to appear after S013 and S045 is 1.00000 or ¹⁄₁. In another trigram model [S013, S064, S033], the probability for S033 to appear after S013 and S064 is 0.75000 or ¾. Similarly, the probability for a particular symbol to appear is determined for the following two preceding symbols. In order to perform the calculation for the appearance probability at a high speed, the probability values are multiplied by −1000 to make them integer. These integer values are generated as a trigram model based on the training data for English, German, Italian, Spanish and Japanese and are stored in the corresponding trigram table in non-volatile memory 5. Subsequently, for each character line, the above described trigram probability for a third symbol following two preceding symbols is determined for an inputted document in the symbol format. The probability determination is made by reading the probability integer value from the stored table. The above probability determination is made using each of the languages that are represented by the trigram tables.

In general, a language used in text is usually one for each document, section or paragraph. Except for the use of foreign words or names, it is rare that multiple languages co-exist in a document. For this reason, a number of lines for the maximal occurrence probability is totaled for either the Asian language group or the European/US language group for an entire page of text. The Asian language group includes Japanese while the European/US language group includes English, French, Germany, Italian and Spanish. The total line number for each group is compared in order to determine a language of the text based upon a simple majority rule. In deciding by the simple majority rule, the rule is optionally conditioned upon a predetermined difference between the total number of lines and a certain threshold value, the length of the lines and the line height of the most frequently occurring lines. These conditions are exemplary and not exhaustive.

Figure 9:
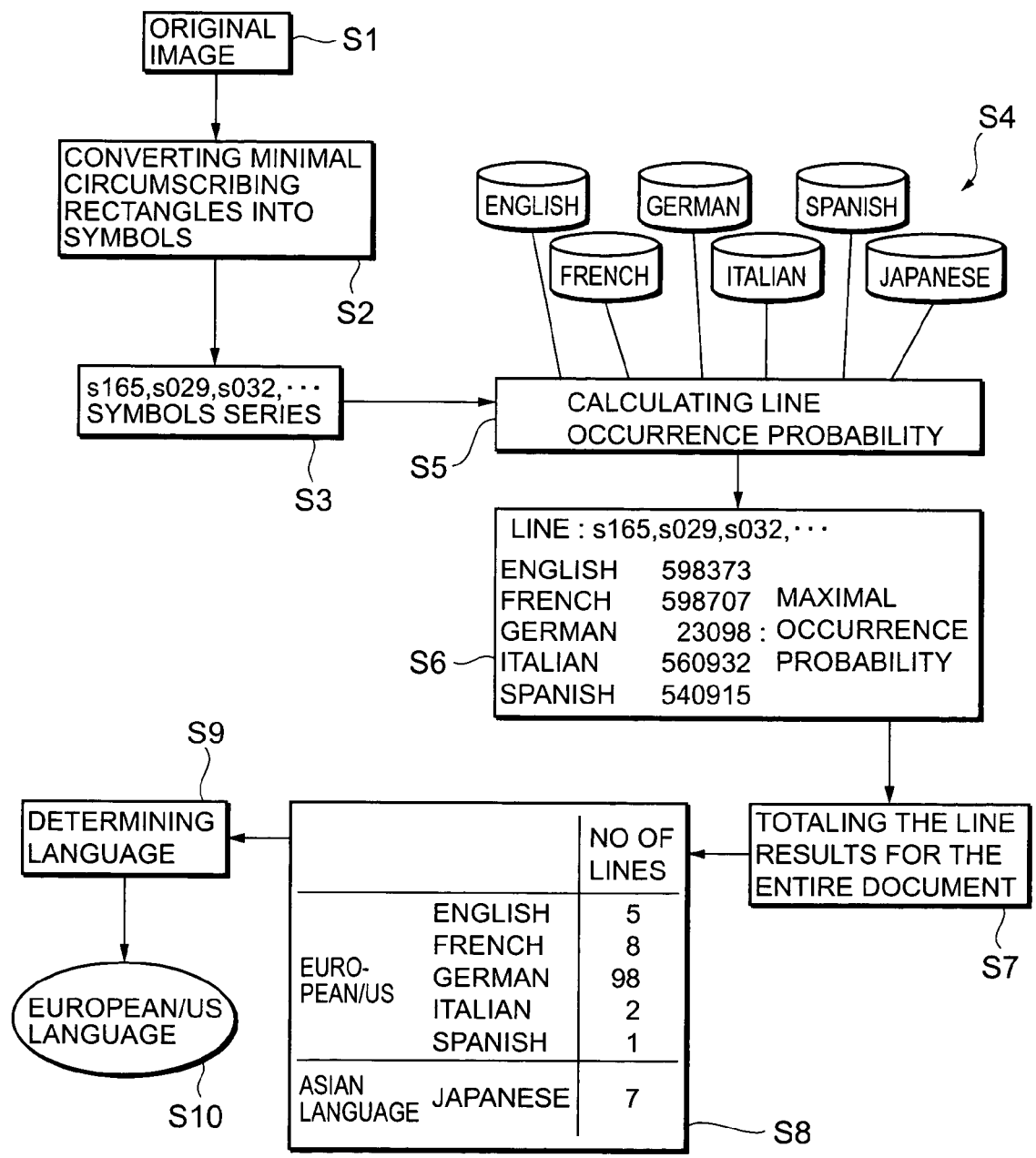
FIG. 9 is a flow chart illustrating steps involved in a preferred process of recognizing a language according to the current invention.

Now referring to FIG. 9, a flow chart illustrates steps involved in a preferred process of recognizing a language according to the current invention. As shown, original document images are inputted in a step S1. Document images in in-line minimal circumscribing rectangles are converted into symbols in a step S2. The converted symbols are placed in symbol series such as s165, s029 and s032 as shown in step S3. Simultaneously with or prior to step S3, trigram tables are generated as shown in step S4 for each of a predetermined languages based upon the corresponding training data. In this example, a trigram table is generated and stored for English, French, Germany, Italian, Spanish and Japanese. Although in this example, trigram tables are used, it is not limited to the trigrams and includes unigrams and bigrams. In a step S5, the occurrence probability for the symbol series, s165, s029, s032 . . . representing a line is determined for each of the above languages based upon the stored trigram tables. As shown in step S6, the resulted maximal occurrence probability is obtained for each of the five predetermined languages for the line. In a step S7, the line results are totaled for the entire one-page document. As shown in a step S8, the total number of lines representing the maximal occurrence probability is tabulated for each language. Based upon the result from the step S8, the total number of lines is 114 for the European/US language group while that is 7 for the Asian language group. By a simple majority rule, the current language in the original image is determined in a step S9. As a result, the current language is determined to be one of the European/US languages as shown in a Step S1. Alternatively, a particular language rather than a language group is determined based upon the above total numbers of lines. In the examples as shown in the step S8, it is most likely that the current language is German since the corresponding number of lines is the highest.

Figure 10:
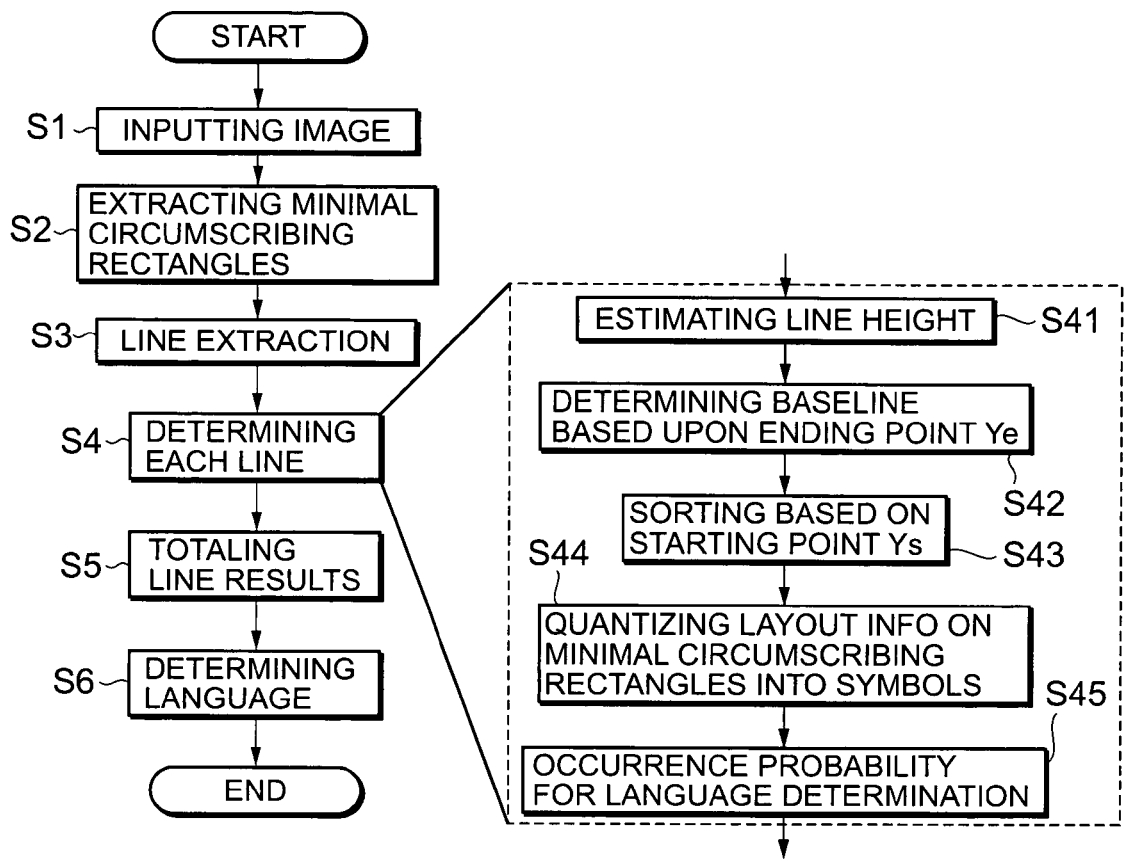
FIG. 10 is a flow chart illustrating steps involved in another preferred process of recognizing a language according to the current invention.

Now referring to FIG. 10, a flow chart illustrates steps involved in a preferred process of recognizing a language according to the current invention. With respect to the description of the steps, although the components and units of FIG. 1 will be referred below, the implementation of the preferred process is not limited to the referred components and units. In general, after inputting a command to initiate a language recognition process via the keyboard 6, the CPU inputs document image data from a scanner in a step S1. In a step S2, continuous or running black pixels are identified in order to determine a corresponding minimal circumscribing rectangle. Adjacent ones of the minimal circumscribing rectangles are joined to form a character line in the step S2. The character lines are extracted in a step S3. Subsequently, a language is recognized in the extracted character lines in a step S4, which will be later further described in detail in steps S41 through 44. In a step S5, the language occurrence results in each line are totaled for the entire page of the document. Based upon the total, a language is recognized or determined by a majority rule in a step S6.

Still referring to FIG. 10, another part of the flow chart illustrates steps for each character line involved in a preferred process of recognizing a language according to the current invention. After the character line has been extracted in the step S3, the character line height is estimated by a maximal height in case of a skewed line or small in-line minimal circumscribing rectangles in the input image data. For this reason, the in-line minimal circumscribing rectangle height h is multiplied by a predetermined number, and the product is compared to an actual line height H as described with respect to FIG. 4. For example, assuming that a predetermined multiple is 1.2, the maximal in-line minimal circumscribing rectangle height hs is multiplied by 1.2, and it is determined whether or not the product is larger than the actual line height H. If the product is larger than H, the maximal in-line minimal circumscribing rectangle height hs is considered to be the line height H in a step S41. In a next step S42, a baseline is determined. For the baseline determination, a regression line is determined for the ending point height Ye of the in-line minimal circumscribing rectangle. The ending point height Ye is limited to less than a half of the character line, and the regression line is used as a baseline in the character line. In a step S43, the in-line minimal circumscribing rectangles are ordered according to the beginning point Ys of each of the in-line minimal circumscribing rectangles. Subsequently, the layout information in the ordered in-line minimal circumscribing rectangles is quantified and converted into symbol series in a step S44. Finally, the occurrence probability is calculated based upon the symbol series for each language in a step S45.

In a second preferred embodiment, the in-line minimal circumscribing rectangle height is used in stead of the in-line minimal circumscribing rectangle starting point height in converting the in-line minimal circumscribing rectangles into symbols. In the second preferred embodiment, the following equations determine certain values:

$$\text{HeightRate} = h/H$$

$$\text{HeightVal} = \text{INT}((\text{HeightRate}*(N-1))+0.5)$$

Where the function, INT( ) throws the sub-decimal numbers. The ID labels are provided in the range from 0 to (N−1). After the ID labeling step, the language recognition process is substantially identical to that of the first preferred embodiment.

In a third preferred embodiment, the width of the in-line minimal circumscribing rectangles is used in converting the in-line minimal circumscribing rectangles into symbols. In the third preferred embodiment, the following equations determine certain values:

$$\text{WidthRate} = W/H$$

$$\text{WidthVal} = \text{INT}((\text{WidthRate}*(N-1))+0.5)$$

Where the function, INT( ) throws the sub-decimal numbers. The ID labels are provided in the range from 0 to (N−1). After the ID labeling step, the language recognition process is substantially identical to that of the first preferred embodiment.

In a fourth preferred embodiment, the black pixel density of the in-line minimal circumscribing rectangles is used in converting the in-line minimal circumscribing rectangles into symbols. It is generally known that the black pixel density in the European/US languages is lower than that in the Asian languages in the in-line minimal circumscribing rectangles due to the complexity of the character structure. Based upon the above black pixel density difference, a language recognition process utilizes the black density as a criterion in recognizing a language. The black pixel density is defined as ratio between the number of black pixels in a particular in-line minimal circumscribing rectangle and the total number of black pixels in the character line. The ID labels are provided in the range from 0 to (N−1). After the ID labeling step, the language recognition process is substantially identical to that of the first preferred embodiment.

In a fifth preferred embodiment, the in-line minimal circumscribing rectangular layout differs between the European/US languages and the Asian languages as shown in FIGS. 3A and 3B. In particular, the distance between the two adjacent in-line minimal circumscribing rectangles is substantially different between the two language groups. That is, the above distance is positive in the European/US languages, and the in-line minimal circumscribing rectangles rarely overlap with each other. On the other hand, the above distance is not always positive in the Asian languages since the in-line minimal circumscribing rectangles frequently overlap with each other. Furthermore, language-dependent unique characters exist at a certain distance from the adjacent minimal circumscribing rectangle in the European/US languages. For example, English characters such as "i" and "j" have a single dot that is located over the corresponding minimal circumscribing rectangle. In German, certain characters have two single dots that are located over the corresponding minimal circumscribing rectangle. In Spanish, the character, "ñ" has a special curvy character that is located over the corresponding minimal circumscribing rectangle. Thus, the above described distance to the adjacent minimal circumscribing rectangle is used as a criterion to recognize a language.

Figure 11:
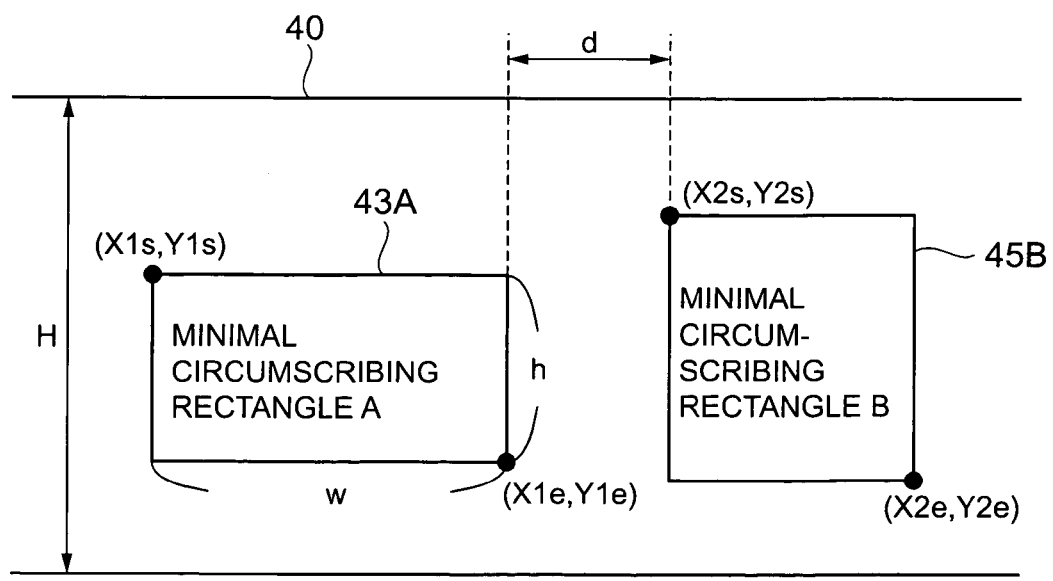
FIG. 11 is a diagram illustrating how in-line layout information is converted into symbol series according to the current invention.

Now referring to FIG. 11, a diagram illustrates how in-line layout information is converted into symbol series according to the current invention. An in-line minimal circumscribing rectangle 43A is located within a character line rectangle 40 having a height H. The in-line minimal circumscribing rectangle 43A is defined by a beginning point ($X1s, Y1s$) and an ending point ($X1e, Y1e$). An in-line minimal circumscribing rectangle 45B is also located within the character line rectangle 40 and is defined by a beginning point ($X2s, Y2s$) and an ending point ($X2e, Y2e$). The distance between the in-line minimal circumscribing rectangles 43A and 45B is a positive value and is indicated by a double-headed arrow line d between the two dotted lines. In the sixth preferred embodiment, the following equations determine certain values:

RightDistanceRate=$d/H$

RightDistanceVal=INT((RightDistanceRate*($N-1$))+0.5)

Where the function, INT( ) throws the sub-decimal numbers. The ID labels are provided in the range from 0 to (N−1) steps. If the distance d is negative, since the in-line minimal circumscribing rectangles 43A and 45B overlap with each other in the horizontal direction, it is optionally assign another set of labels.

Still referring to FIG. 11, the in-line layout characteristic information is used in the following manners as well. With respect to a single in-line minimal circumscribing rectangle such as the in-line minimal circumscribing rectangle 43A alone, the in-line layout characteristic information is expressed in three-dimensional vectors as follows:

$Y1s/H$, $h/H$ and $w/H$

In contrast, with respect to two in-line minimal circumscribing rectangles such as the in-line minimal circumscribing rectangles 43A and 45B, the in-line layout characteristic information is expressed in four-dimensional vectors as follows:

$Y1s/H$, $h/H$, $w/H$ and $d/H$

Now referring to FIG. 12, a diagram illustrates how a blank distance is used in a preferred process of generating symbols according to the current invention. A reference number 44 indicates a space between in-line minimal circumscribing rectangles 43 and 45, and a distance b exists between the in-line minimal circumscribing rectangles 43 and 45. For the blank space 44, the underlined ID label, "sSPC" is assigned as a fourth element in a character line 40 following the characters "W," "h," and "y." In the character line 41 having a height H, there are other blank spaces. A first blank space 39 exists between in-line minimal circumscribing rectangles 41 and 42 and has a distance a while a second blank space 47 exists between in-line minimal circumscribing rectangles 46 and 48 and has a distance c. The CPU1 and the software program determine whether or not a blank space is sufficiently large enough to be considered as a bona fide in-between word space. In general, the distance between a current in-line minimal circumscribing rectangle is divided by the character line height to generate a ratio. Subsequently, the ratio is compared to a predetermined threshold value in order to conclude that the current blank space is a bona fide in-between word space. In the above example, the ratio between the character line H and each of the distances a, b and c is compared to a predetermined threshold value. The ratios are respectively determined by a/H, b/H and c/H, and one exemplary predetermined threshold value is 0.25. If any of the ratios exceeds the predetermined threshold value, then the corresponding space is considered to be a bona fide in-between word space. In the above example as shown in FIG. 12, the spaces 44 and 47 are both considered to be a bona fide in-between word space while the space 39 is not. Thus, the spaces 44 and 47 are both assigned the label, "sSPC."

In a sixth preferred embodiment, the symbol conversion is performed on a predetermined set of parameters rather than on a single vector or parameter according to the current invention. As described above, a single vector is independently converted into symbol series, and the single vectors include the in-line minimal circumscribing rectangle starting point height (Ys/H), the in-line minimal circumscribing rectangle height (h/H), the black pixel density, the in-line minimal circumscribing rectangle space. In contrast, the sixth preferred embodiment collectively converts multiple parameters or vectors into symbols, and the vectors include the in-line minimal circumscribing rectangle starting point height (Ys/H), the in-line minimal circumscribing rectangle height (h/H) and the in-line minimal circumscribing rectangle width (w/H). The in-line minimal circumscribing rectangle starting point height value (Ys/H) is divided into fifteen discrete ranges and is stored in four bits. The in-line minimal circumscribing rectangle height value (h/H) is divided into eight discrete ranges and is stored in three bits. The in-line minimal circumscribing rectangle width value (w/H) is divided into two discrete ranges and is stored in one bit. In other words, all of the above layout information is stored in eights bit or one byte.

Now referring to FIG. 13, a diagram illustrates a data structure for the above described layout information on the in-line minimal circumscribing rectangle according to the current invention. The data structure includes a 4-bit in-line minimal circumscribing rectangle starting point height area, a 3-bit in-line minimal circumscribing rectangle height area and a 1-bit in-line minimal circumscribing rectangle width area. The three-vector converted symbols include 240 combinations as they are a product of 15 ranges, 8 ranges and 2 ranges. Since the maximal number in one byte storage is 256, additional 16 symbols are available since the currently used number of the symbols is 240 combinations. One of the 16 available symbols is assigned to the bona fide in-between word blank, sSPC. Furthermore, in alternative embodiments, the data structure, the memory area and the memory size are not limited to the above described implementations. In addition to the in-line minimal circumscribing rectangle starting point height (Ys/H), the in-line minimal circumscribing rectangle height (h/H) and the in-line minimal circumscribing rectangle width (w/H), the black pixel density is optionally included in the data structure. The data structure, the memory area and the memory size are also optionally modified in the alternative embodiments.

In a seventh preferred embodiment, a single dimensional symbol data series is used to represent multi-dimensional vector data series according to the current invention. As described above with respect to the sixth preferred embodiment, three dimensional vector data is obtained based upon the in-line minimal circumscribing rectangle starting point height (Ys/H), the in-line minimal circumscribing rectangle height (h/H) and the in-line minimal circumscribing rectangle width (w/H) of the training data. The three dimensional vector data is represented by the 240 kinds or combinations of representative vectors. The representative vector group is called a code book. In order to distinguish the 240 vectors in the code book, an ID label is assigned to the vectors. If a plurality of the characteristic information on the in-line minimal circumscribing rectangle is distinguished for each dimension of the multi-dimensional vectors, a single representative vector is generated from the layout information. The symbol series conversion is to obtain a few number of representative vector data from a plurality of the vector data. That is, the symbol series conversion is to obtain the representative vector data, and by attaching a label to the obtained representative vector data, the multi-dimensional vector data series are converted into a single dimensional vector data series.

In a eighth preferred embodiment, software programs are stored in a storage medium to be later read by the language recognition device such as a computer to function as a language recognition device according to the current invention. The software programs contain computer readable and executable instructions that implement a preferred process of recognizing a language based upon the document image. The software programs are stored in storage media such as flexible disks, CD-ROM's, DVD-ROM's and MO's. In addition to the above mentioned exemplary storage media, the computer software programs are read into the language recognition device or the general computer via the Internet, the Intranet or other networks.

Now referring to FIG. 14, a flow chart illustrates steps involved in a preferred process of recognizing a language according to the current invention. In a step S1, a document image is inputted for the original document whose language is to be determined. In a step S2, the inputted document image is processed based on in-line minimal circumscribing rectangles according to the above described trigram. The in-line minimal circumscribing rectangle layout characteristics are expressed by three-dimensional vectors as described with respect to FIG. 11, and a rough distinction between the Asian language group and the European/US language group is made on the inputted image data. Based upon the above approximate distinction in the step S2, it is determined in a step S3 that the inputted document image is written in whether a European/US language or an Asian language. If it is determined in the step S3 that the inputted document image is written in a European/US language, it is further determined in a step S4 which particular language it is among the predetermined European/US languages. In the step S4, the inputted document image is initially converted into text data by performing optical character recognition (OCR) using a predetermined European/US OCR filter. The inputted data now in the converted text format is compared to text-based trigram tables that have been previously generated based upon training data prior to the step S4. The details of the comparison based upon the previously generated trigram tables have been already provided with respect to FIGS. 9 and 10. For this reason, the relevant description is incorporated here and is not reiterated. Ultimately, the comparison in the step S4 generates a result 1 for indicating a particular European/US language. If it is determined in the step S3 that the inputted document image is written in an Asian language, it is further determined in a step S5 which particular language it is among the predetermined Asian languages. The in-line minimal circumscribing rectangle layout characteristics are expressed by four-dimensional vectors three-dimensional vectors as described with respect to FIG. 11, and the characteristics information is compared to the minimal circumscribing rectangle trigram tables that that have been previously generated based upon training data prior to the step S4. The details of the comparison based upon the previously generated trigram tables have been already provided with respect to FIGS. 9 and 10. For this reason, the relevant description is incorporated here and is not reiterated. Ultimately, the comparison in the step S5 generates a result 2 for indicating a particular Asian language.

Now referring to FIG. 15, a flow chart illustrates steps involved in a preferred process of recognizing a language according to the current invention. In a step S1, a document image is inputted for the original document whose language is to be determined. In a step S2, the inputted document image is processed based on in-line minimal circumscribing rectangles according to the above described trigram. The in-line minimal circumscribing rectangle layout characteristics are expressed by four-dimensional vectors three-dimensional vectors as described with respect to FIG. 11, and a distinction between the Asian languages including Japanese and Chinese is made on the inputted image data. On the other hand, if the inputted document is not in either of the above two languages, a distinction is determined to be one of European/US languages. Based upon the above distinction in the step S2, it is determined in a step S3 that the inputted document image is written in whether a European/US language. If it is determined in the step S3 that the inputted document image is written in a European/US language, it is further determined in a step S4 which particular language it is among the predetermined European/US languages. In the step S4, the inputted document image is initially converted into text data by performing optical character recognition (OCR) using a predetermined European/US OCR filter. The inputted data now in the converted text format is compared to text-based trigram tables that have been previously generated based upon training data prior to the step S4. The details of the comparison based upon the previously generated trigram tables have been already provided with respect to FIGS. 9 and 10. For this reason, the relevant description is incorporated here and is not reiterated. Ultimately, the comparison in the step S4 generates a result 1 for indicating a particular European/US language. If it is determined in the step S3 that the inputted document image is not written in a European/US language, it is already known form the step S2 which particular Asian language it is among the predetermined Asian languages including Japanese and Chinese. Thus, the comparison in the step S2 generates a result 2 for indicating the particular Asian language.

Figure 16:
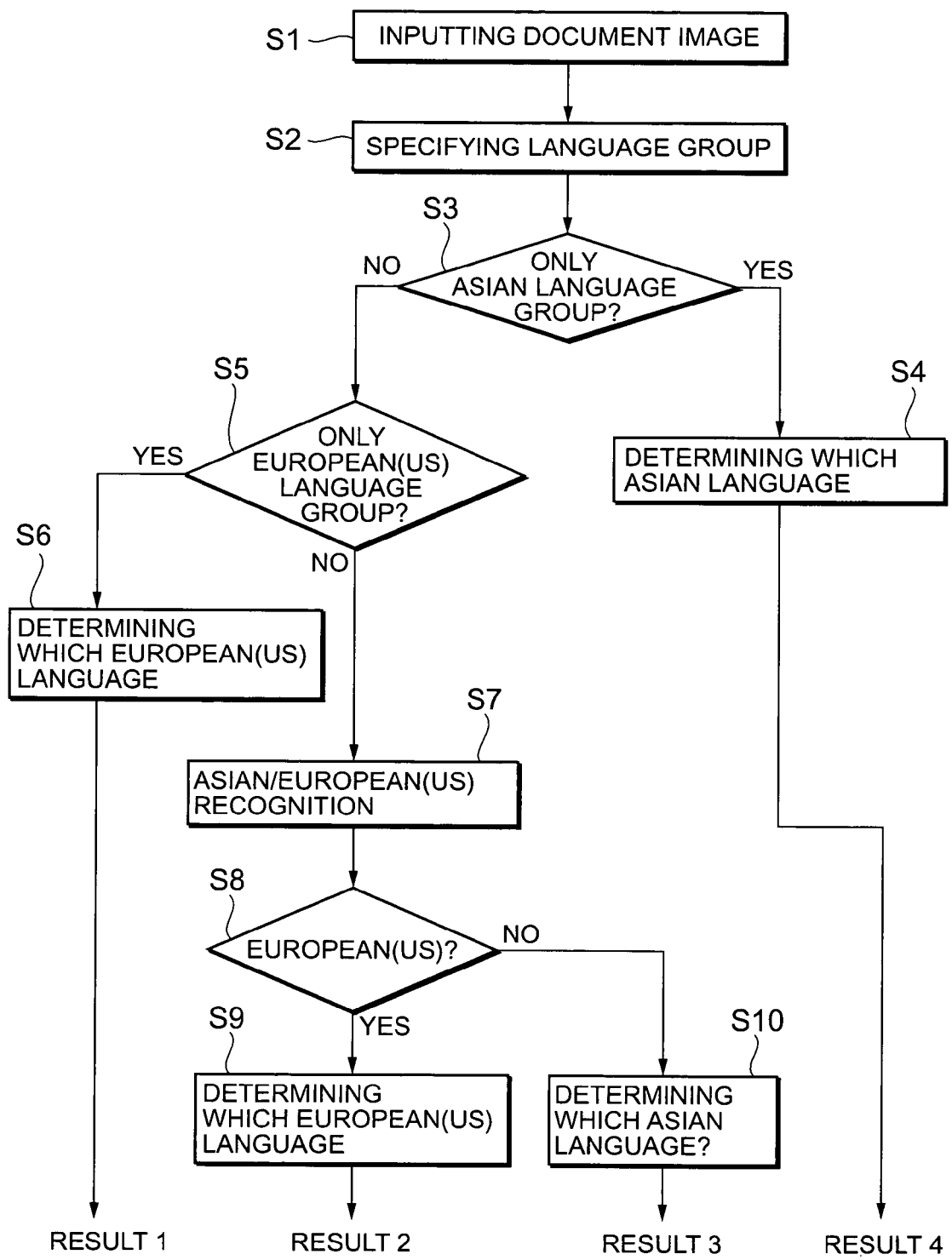
FIG. 16 is a flow chart illustrating steps including user inputs in a preferred process of recognizing a language according to the current invention.

Now referring to FIG. 16, a flow chart illustrates steps including user inputs in a preferred process of recognizing a language according to the current invention. In a step S1, a document image is inputted for the original document whose language is to be determined. In a step S2, a user specifies a language group in which the inputted document image is compared. Based upon the user input in the step S2, it is determined whether or not the user has specified an Asian language group only in a step S3. If it is determined in the step S3 that the user has indeed specified only the Asian language group, the inputted document image is processed based on in-line minimal circumscribing rectangles according to the previously generated trigram in a step S4. The in-line minimal circumscribing rectangle layout characteristics are expressed by four-dimensional vectors three-dimensional vectors as described with respect to FIG. 11, and a distinction is made for a particular Asian language. Ultimately, a result 4 is generated for indicating a particular Asian language. On the other hand, if it is determined in the step S3 that the user has not specified only the Asian language group, it is further determined in a step S5 whether or not the user has specified only the European/US language group. If it is determined in the step S5 that the user has specified only the European/US language group, it is further determined in a step S6 which particular language it is among the predetermined European/US languages. In the step S6, the inputted document image is initially converted into text data by performing optical character recognition (OCR) using a predetermined European/US OCR filter. The inputted data now in the converted text format is compared to text-based trigram tables that have been previously generated based upon training data prior to the step S6. The details of the comparison based upon the previously generated trigram tables have been already provided with respect to FIGS. 9 and 10. For this reason, the relevant description is incorporated here and is not reiterated. Ultimately, the comparison in the step S6 generates a result 1 for indicating a particular European/US language.

Still referring to FIG. 16, if it is determined in the step S5 that the user has specified neither the Asian language group only nor the European/US language group only, the process that is similar to one in FIG. 14 is performed on the inputted image data. In a step S7, the inputted document image is processed based on in-line minimal circumscribing rectangles according to the above described trigram. The in-line minimal circumscribing rectangle layout characteristics are expressed by three-dimensional vectors three-dimensional vectors as described with respect to FIG. 11, and a rough distinction between the Asian language group and the European/US language group is made on the inputted image data. Based upon the above approximate distinction in the step S7, it is determined in a step S8 that the inputted document image is written in whether a European/US language or an Asian language. If it is determined in the step S8 that the inputted document image is written in a European/US language, it is further determined in a step S9 which particular language it is among the predetermined European/US languages. In the step S9, the inputted document image is initially converted into text data by performing optical character recognition (OCR) using a predetermined European/US OCR filter. The inputted data now in the converted text format is compared to text-based trigram tables that have been previously generated based upon training data prior to the step S9. The details of the comparison based upon the previously generated trigram tables have been already provided with respect to FIGS. 9 and 10. For this reason, the relevant description is incorporated here and is not reiterated. Ultimately, the comparison in the step S9 generates a result 2 for indicating a particular European/US language. If it is determined in the step S8 that the inputted document image is written in an Asian language, it is further determined in a step S10 which particular language it is among the predetermined Asian languages. The in-line minimal circumscribing rectangle layout characteristics are expressed by four-dimensional vectors three-dimensional vectors as described with respect to FIG. 11, and the characteristics information is compared to the minimal circumscribing rectangle trigram tables that that have been previously generated based upon training data prior to the step S8. The details of the comparison based upon the previously generated trigram tables have been already provided with respect to FIGS. 9 and 10. For this reason, the relevant description is incorporated here and is not reiterated. Ultimately, the comparison in the step S10 generates a result 3 for indicating a particular Asian language.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of quantifying document image data, comprising:
    using a processor to implement the following steps: quantifying a predetermined number of consecutive characters in first document image data into first quantified data based upon layout characteristic information, the first document image data containing character lines, each of the character lines including characters, the layout characteristic information being based upon a minimal circumscribing rectangle around each of the characters, the layout characteristic information including a plurality of parameters, the parameters including a combination of information on a height of the minimal circumscribing rectangle starting from a bottom line in the character line, a height of the minimal circumscribing rectangle, a width of the minimal circumscribing rectangle, a black pixel density in the minimal circumscribing rectangle and a distance between two adjacent ones of the minimal circumscribing rectangles;
    converting the first quantified data into symbol series; and
    generating a table representing occurrence probabilities of the consecutive characters based upon the symbol series.

2. The method of quantifying document image data according to claim 1 wherein the layout characteristic information is based upon the character line.

3. The method of quantifying document image data according to claim 1 wherein the layout characteristic information includes a single parameter.

4. The method of quantifying document image data according to claim 1 further comprising additional steps of:
    inputting second document image data in an unknown language;
    converting the second document image data into second quantified data representing the predetermined number of the consecutive characters based upon the layout characteristic information;
    comparing the second quantified data in the table;
    totaling the occurrence probabilities for a predetermined amount of the second document image to generate a totaled occurrence probability result; and
    determining whether or not the second document image data is in the same language as the first document image data based upon the totaled occurrence probability result.

5. A computer readable medium containing computer readable instructions for quantifying document image data, the computer-readable instructions performing the tasks of:
    quantifying a predetermined number of consecutive characters in first document image data into first quantified data based upon layout characteristic information, the first document image data containing character lines, each of the character lines including characters, the layout characteristic information being based upon a minimal circumscribing rectangle around each of the characters, the layout characteristic information including a plurality of parameters, the parameters including a combination of information on a height of the minimal circumscribing rectangle starting from a bottom line in the character line, a height of the minimal circumscribing rectangle, a width of the minimal circumscribing rectangle, a black pixel density in the minimal circumscribing rectangle and a distance between two adjacent ones of the minimal circumscribing rectangles;

converting the first quantified data into symbol series; and generating a table representing occurrence probabilities of the consecutive characters based upon the symbol series.

6. The computer readable medium containing computer-readable instructions for quantifying document image data according to claim 5 wherein the layout characteristic information is based upon the character line.

7. The computer readable medium containing computer-readable instructions for quantifying document image data according to claim 5 wherein the layout characteristic information includes a single parameter.

8. The computer readable medium containing computer-readable instructions for quantifying document image data according to claim 5 further performing additional tasks of:

inputting second document image data in an unknown language;

converting the second document image data into second quantified data representing the predetermined number of the consecutive characters based upon the layout characteristic information;

comparing the second quantified data in the table;

totaling the occurrence probabilities for a predetermined amount of the second document image to generate a totaled occurrence probability result; and determining whether or not the second document image data is in the same language as the first document image data based upon the totaled occurrence probability result.

9. An apparatus for quantifying document image data, comprising:

an input device for inputting first document image data containing lines and characters in the lines, the first document image data having certain layout characteristics;

a data processor connected to said input device for quantifying a predetermined number of consecutive ones of the characters in the first document image data into first quantified data based upon layout characteristic information, said data processor converting the first quantified data into symbol series, said data processor generating a table representing occurrence probabilities of the consecutive characters based upon the symbol series, said data processor generating a minimal circumscribing rectangle around each of the characters, the layout characteristic information being based upon the minimal circumscribing rectangle and including a plurality of parameters, the parameters including a combination of information on a height of the minimal circumscribing rectangle starting from a bottom line in the character line, a height of the minimal circumscribing rectangle, a width of the minimal circumscribing rectangle, a black pixel density in the minimal circumscribing rectangle and a distance between two adjacent ones of the minimal circumscribing rectangles; and a memory connected to said data processing unit for storing the first quantified data, the symbol series, occurrence probabilities and the table.

10. The apparatus for quantifying document image data according to claim 9 wherein the layout characteristic information is based upon the character line.

11. The apparatus for quantifying document image data according to claim 9 wherein the layout characteristic information includes a single parameter.

12. The apparatus for quantifying document image data according to claim 9 wherein said input unit subsequently inputting second document image data in an unknown language, said data processing unit converting the second document image data into second quantified data representing the predetermined number of the consecutive characters based upon the layout characteristic information, said data processing unit comparing the second quantified data in the table and totaling the occurrence probabilities for a predetermined amount of the second document image to generate a totaled occurrence probability result, wherein said data processing unit determining whether or not the second document image data is in the same language as the first document image data based upon the totaled occurrence probability result.

* * * * *